(12) United States Patent
Hull et al.

(10) Patent No.: US 9,670,981 B2
(45) Date of Patent: Jun. 6, 2017

(54) MOTION-DAMPING SYSTEMS AND METHODS INCLUDING THE SAME

(71) Applicant: The Boeing Company, Seal Beach, CA (US)

(72) Inventors: John Ralph Hull, Sammamish, WA (US); Michael Strasik, Sammamish, WA (US); Thomas H. Martig, Seattle, WA (US)

(73) Assignee: The Boeing Company, Chicago, IL (US)

( * ) Notice: Subject to any disclaimer, the term of this patent is extended or adjusted under 35 U.S.C. 154(b) by 638 days.

(21) Appl. No.: 14/105,046

(22) Filed: Dec. 12, 2013

(65) Prior Publication Data

US 2015/0252864 A1 Sep. 10, 2015

(51) Int. Cl.
*F16F 15/03* (2006.01)
*F16F 7/10* (2006.01)
(Continued)

(52) U.S. Cl.
CPC .............. *F16F 7/1011* (2013.01); *B64C 9/02* (2013.01); *F16F 15/03* (2013.01); *F16F 15/035* (2013.01); *B64D 2045/0085* (2013.01)

(58) Field of Classification Search
CPC ......... F16F 7/1011; F16F 15/035; F16F 15/03
See application file for complete search history.

(56) References Cited

U.S. PATENT DOCUMENTS 4,624,435 A * 11/1986 Freudenberg ........... F16F 15/03
180/300

5,039,047 A 8/1991 Pitzo
(Continued)

FOREIGN PATENT DOCUMENTS

DE 24 33 131 1/1976
DE 10227968 9/2003
(Continued)

OTHER PUBLICATIONS

Extended European Search Report for related application EP 14191500, Jun. 18, 2015.
(Continued)

*Primary Examiner* — Bradley King
(74) *Attorney, Agent, or Firm* — Dascenzo Intellectual Property Law, PC

(57) ABSTRACT

Motion-damping systems and methods that include motion-damping systems are disclosed herein. The motion-damping systems are configured to damp relative motion between a base structure and an attached component that define a gap therebetween. The systems include an at least substantially rigid tubular structure that defines an internal volume and extends within the gap. The systems also include a magnetic assembly and a magnetically active body. One of the magnetic assembly and the magnetically active body is located within the tubular structure and the other of the magnetic assembly and the magnetically active body is operatively attached to a selected one of the base structure and the attached component. The magnetic assembly is in magnetic communication with the magnetically active body such that a magnetic interaction therebetween resists motion of the attached component relative to the base structure. The methods include dissipating energy with the motion-damping system.

19 Claims, 3 Drawing Sheets

(51) Int. Cl.
   *B64C 9/02*   (2006.01)
   *B64D 45/00*   (2006.01)

(56) References Cited

U.S. PATENT DOCUMENTS

| | | | | |
|---|---|---|---|---|
| 5,465,815 | A * | 11/1995 | Ikegami | F16D 63/00 188/164 |
| 6,588,554 | B2 * | 7/2003 | Fujita | F16F 6/005 188/267 |
| 2002/0017749 | A1 * | 2/2002 | Fujita | F16F 3/026 267/140.15 |
| 2003/0080246 | A1 * | 5/2003 | Koizumi | B64C 9/02 244/99.3 |
| 2007/0051576 | A1 * | 3/2007 | Shimoda | E04B 1/985 188/380 |
| 2011/0254394 | A1 * | 10/2011 | Piaton | F16H 25/2252 310/77 |
| 2013/0000991 | A1 | 1/2013 | Scholz et al. | |
| 2015/0345134 | A1 * | 12/2015 | Takahashi | F16F 9/535 52/167.2 |

FOREIGN PATENT DOCUMENTS

| | | |
|---|---|---|
| EP | 2472139 | 7/2012 |
| EP | 1 172 581 | 11/2015 |

OTHER PUBLICATIONS

English machine-translation of abstract of DE 10227968, downloaded from espacenet.org on Jun. 26, 2015.
Canadian Intellectual Property Office, Office action issued in related pending Canadian Patent Application No. 2,864,205, Nov. 25, 2015.
Machine-generated English translation of DE 24 33 131, downloaded from espacenet.com on Jan. 27, 2016.

* cited by examiner

MOTION-DAMPING SYSTEMS AND METHODS INCLUDING THE SAME

FIELD

The present disclosure is directed generally to motion-damping systems, and more particularly to motion-damping systems that are configured to damp relative motion between a base structure and an attached component.

BACKGROUND

A base structure may include an attached component that is configured to move (such as to rotate and/or translate) relative to the base structure. Under certain conditions, it may be desirable to damp relative motion and/or vibration between the base structure and the attached component.

As an illustrative, non-exclusive example, an aircraft may include external attached components, such as flaps, that may be configured to be actuated and/or moved relative to a remainder of the aircraft, such as during and/or to control flight of the aircraft. These external attached components may be subject to significant wind and/or drag forces during flight of the aircraft, and these forces may produce vibration and/or flutter of the external attached components. Flutter is a self-feeding, or resonant, condition in which the forces couple with a natural frequency of the external attached component, generating larger and larger amplitude vibrations between the external attached component and the aircraft.

Conventionally, aircraft include hydraulic dampers that may be utilized to damp relative motion of the external attached component. While these hydraulic dampers may be effective at damping relative motion and/or vibration, they may be complicated, heavy, and/or costly to implement and/or maintain. Thus, there exists a need for improved motion-damping systems.

SUMMARY

Motion-damping systems and methods that include motion-damping systems are disclosed herein. The motion-damping systems are configured to damp relative motion between a base structure and an attached component that define a gap therebetween. The systems include an at least substantially rigid tubular structure that defines an internal volume and extends within the gap. The systems also include a magnetic assembly and a magnetically active body. One of the magnetic assembly and the magnetically active body is located within the tubular structure and the other of the magnetic assembly and the magnetically active body is operatively attached to a selected one of the base structure and the attached component. The magnetic assembly is in magnetic communication with the magnetically active body such that a magnetic interaction therebetween resists motion of the attached component relative to the base structure.

In some embodiments, the magnetically active body includes a ferromagnetic body. In some embodiments, the magnetically active body includes an electrically conductive body. In some embodiments, the magnetically active body includes both the ferromagnetic body and the electrically conductive body. In some embodiments, the electrically conductive body is located between the ferromagnetic body and the magnetic assembly. In some embodiments, the magnetic assembly and the ferromagnetic body are oriented such that a magnetic force therebetween generates a normal force between the ferromagnetic body and the electrically conductive body.

In some embodiments, the magnetic assembly includes a magnet. In some embodiments, the magnetic assembly includes a pair of magnets. In some embodiments, a ferromagnetic flux return bar extends between two magnets of the pair of magnets. In some embodiments, the magnetic assembly includes a plurality of pairs of magnets. In some embodiments, an electrical insulator extends between a given pair of magnets and an adjacent pair of magnets of the plurality of pairs of magnets.

In some embodiments, the tubular structure is operatively affixed to one of the base structure and the attached component. In some embodiments, the magnetically active body is located within the internal volume of the tubular structure. In some embodiments, the magnetic assembly is operatively affixed to the other of the base structure and the attached component. In some embodiments, the motion-damping system includes a plurality of magnetic assemblies and a plurality of magnetically active bodies.

The methods include dissipating energy with the motion-damping system during rotation of the attached component relative to the base structure. In some embodiments, the dissipating may include dissipating energy via generation of an eddy current. In some embodiments, the dissipating may include dissipating energy via deformation of a viscoelastic material. In some embodiments, the dissipating may include dissipating energy via a magnetic force. In some embodiments, the dissipating may include dissipating energy via a frictional force. In some embodiments, the dissipating may include resisting motion of the attached component relative to the base structure.

DESCRIPTION

Figure 1:
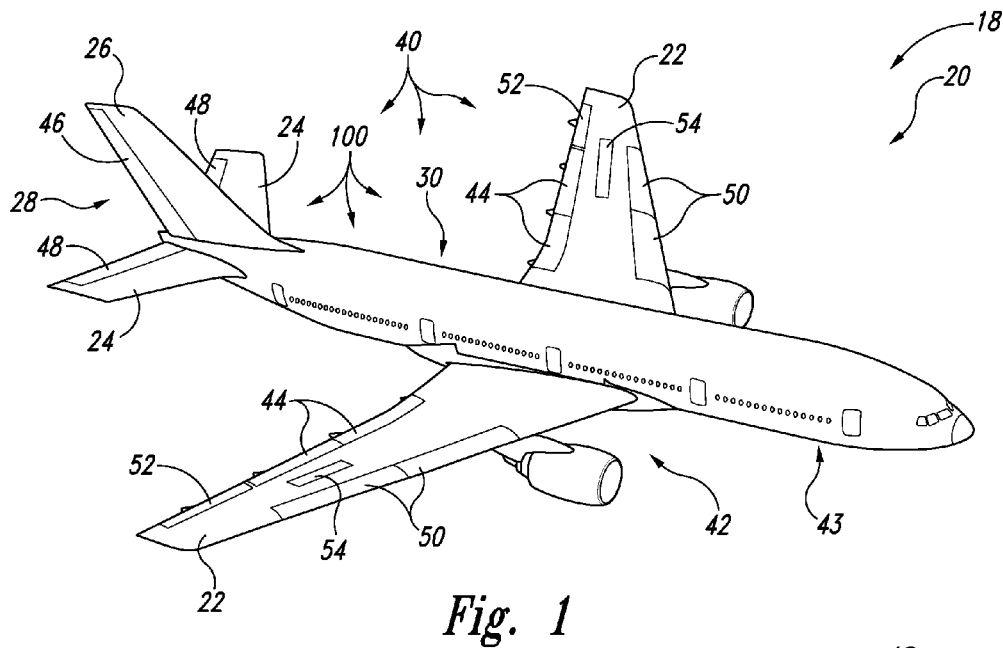
FIG. 1 is a schematic representation of illustrative, non-exclusive examples of an aircraft that may be utilized with and/or include the systems and methods according to the present disclosure.

FIGS. 1-6 provide illustrative, non-exclusive examples of motion-damping systems 100 according to the present disclosure, of mechanical systems 18 that may include and/or utilize motion-damping systems 100, and/or of methods of utilizing motion-damping systems 100. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment and/or method are illustrated in solid lines, while elements that are optional to a given embodiment and/or method are illustrated in dashed lines. However, elements that are shown in solid lines are not essential to all embodiments and/or methods, and an element shown in solid lines may be omitted from a particular embodiment and/or method without departing from the scope of the present disclosure.

FIG. 1 is a schematic representation of illustrative, non-exclusive examples of a mechanical system 18, such as an aircraft 20 that may be utilized with and/or include the systems and methods according to the present disclosure. Aircraft 20 includes wings 22 that are attached to a fuselage 30. Aircraft 20 also includes horizontal stabilizers 24 and a vertical stabilizer 26 that are attached to a tail 28.

Aircraft 20 further includes a plurality of attached components 40. Attached components 40 may be configured to be actuated, to rotate, to translate, and/or to otherwise move relative to a remainder of aircraft 20 and also may be referred to herein as actuated components 40, moving components 40, and/or movable components 40. Attached components 40 may include, be associated with, be operatively attached to, be operatively coupled to, be directly coupled to, and/or be affixed to one or more motion-damping systems 100 according to the present disclosure. Illustrative, non-exclusive examples of actuated components 40 include any suitable main landing gear door 42, nose landing gear door 43, flap 44 (or trailing edge flap 44), rudder 46, elevator 48, slat 50 (or leading edge slat 50), aileron 52, and/or spoiler 54.

Figure 2:
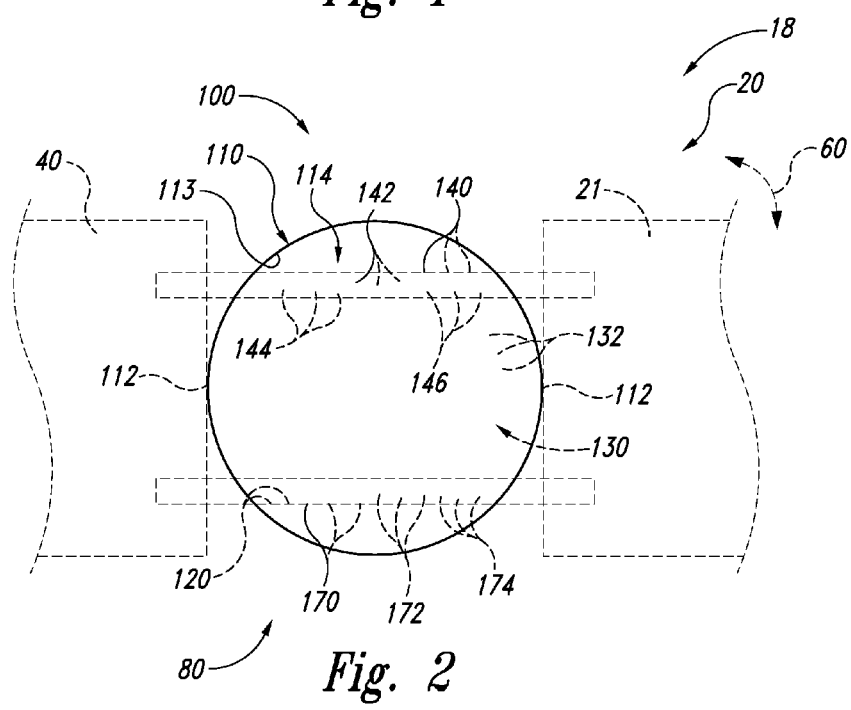
FIG. 2 is a schematic representation of illustrative, non-exclusive examples of a motion-damping system according to the present disclosure.

FIG. 2 is a schematic representation of illustrative, non-exclusive examples of a motion-damping system 100 according to the present disclosure. Motion-damping system 100 may be located within a mechanical system 18, such as an aircraft 20, and is configured to damp relative motion, vibration, and/or flutter between a base structure 21 and an attached component 40 that together define a gap 80 therebetween.

Motion-damping system 100 may include and/or be a passive motion-damping system 100. As such, motion-damping system 100 may not include, be associated with, be in communication with, and/or be regulated by a control system. Instead, motion-damping system 100 may be configured to damp the relative motion automatically and/or based upon one or more characteristics of the various components of motion-damping system 100.

Stated another way, motion-damping system 100 may not be actively controlled. Additionally or alternatively, motion-damping system 100 may not be electrically powered, may not be electrically actuated, may not include electrical components, may be free of electrical components, and/or may be free of electrically actuated components. However, these are not requirements for all embodiments.

As discussed, conventional motion-damping systems may include and/or be hydraulic motion-damping systems. In addition, and as also discussed, such conventional motion-damping systems may be large, heavy, expensive to install, and/or expensive to maintain. With this in mind, motion-damping systems 100 according to the present disclosure may not include hydraulic components, may be free of hydraulic components, may not be hydraulically powered, and/or may not be hydraulic motion-damping systems.

Motion-damping system 100 includes a tubular structure 110 that extends within gap 80 when motion-damping system 100 is present within mechanical system 18. Tubular structure 110 may be in physical contact with base structure 21 and/or with attached component 40, and may be referred to herein as forming an at least partial fluid seal with, or between, base structure 21 and attached component 40.

Motion-damping system 100 further includes at least one magnetic assembly 140 and at least one magnetically active body 170. Magnetic assembly 140 is illustrated in dashed lines in FIG. 2 to indicate that magnetic assembly 140 may be present in and/or operatively affixed to any suitable portion of mechanical system 18. As an illustrative, non-exclusive example, magnetic assembly 140 may be present within and/or may be operatively affixed to base structure 21. As another illustrative, non-exclusive example, magnetic assembly 140 may be present within and/or operatively affixed to attached component 40. As yet another illustrative, non-exclusive example, magnetic assembly 140 may be operatively affixed to tubular structure 110 and/or present within an internal volume 114 that is defined by tubular structure 110. When magnetic assembly 140 is present within internal volume 114, magnetic assembly 140 may be configured to translate within internal volume 114. Alternatively, a location of magnetic assembly 140 may be fixed with respect to tubular structure 110 and/or internal volume 114 thereof.

Similarly, magnetically active body 170 also is illustrated in dashed lines in FIG. 2 to indicate that magnetically active body 170 may be present in and/or operatively affixed to any suitable portion of mechanical system 18. As an illustrative, non-exclusive example, magnetically active body 170 may be present within and/or operatively affixed to base structure 21. As another illustrative, non-exclusive example, magnetically active body 170 may be present within and/or operatively affixed to attached component 40. As yet another illustrative, non-exclusive example, magnetically active body 170 may be operatively affixed to tubular structure 110, may be defined by tubular structure 110, and/or may be present within internal volume 114.

When magnetically active body 170 is present within internal volume 114, magnetically active body 170 may be configured to translate within internal volume 114. Alternatively, a location of magnetically active body 170 may be fixed with respect to tubular structure 110 and/or internal volume 114 thereof. As an illustrative, non-exclusive example, tubular structure 110 may define an inner surface 113 that may define internal volume 114, and magnetically active body 170 may be operatively affixed to inner surface 113. As another illustrative, non-exclusive example, tubular structure 110 may define a recessed region 120, and magnetically active body 170 may be located, at least partially, within recessed region 120.

Regardless of an exact location of magnetic assembly 140 and/or of magnetically active body 170 within mechanical system 18 and/or within motion-damping system 100 thereof, magnetic assembly 140 and magnetically active body 170 may be oriented, or oriented relative to each other, such that a magnetic interaction therebetween resists, or damps, motion of attached component 40 relative to base structure 21. As an illustrative, non-exclusive example, one of magnetic assembly 140 and magnetically active body 170 may be located within tubular structure 110 and the other of magnetic assembly 140 and magnetically active body 170 may be operatively affixed to a selected one of base structure 21 and attached component 40. As another illustrative, non-exclusive example, magnetic assembly 140 and magnetically active body 170 may be oriented adjacent to one another and/or may be in magnetic communication with one another.

As a more specific but still illustrative, non-exclusive example, magnetic assembly 140 may be located within internal volume 114 of tubular structure 110 and magnetically active body 170 may be operatively affixed to the selected one of base structure 21 and attached component 40. As another more specific but still illustrative, non-exclusive example, magnetic assembly 140 may be operatively affixed to the selected one of base structure 21 and attached component 40 and magnetically active body 170 may be located within internal volume 114 of tubular structure 110.

Magnetically active body 170 may include any suitable structure and/or material of construction that may interact with and/or be attracted to a magnetic field that is generated by magnetic assembly 140. As an illustrative, non-exclusive example, magnetically active body 170 may include and/or be a ferromagnetic body 172 that is formed from a ferromagnetic material. As another illustrative, non-exclusive example, magnetically active body 170 may include and/or be an electrically conductive body 174 that is formed from an electrically conductive material.

As yet another illustrative, non-exclusive example, magnetically active body 170 may include both ferromagnetic body 172 and electrically conductive body 174. When magnetically active body 170 includes both ferromagnetic body 172 and electrically conductive body 174, and as discussed in more detail herein, electrically conductive body 174 may be located and/or may extend at least partially between ferromagnetic body 172 and magnetic assembly 140. As an illustrative, non-exclusive example, ferromagnetic body 172 may be positioned to slide against, or with respect to, electrically conductive body 174 during motion of attached component 40 relative to base structure 21. As another illustrative, non-exclusive example, magnetic assembly 140 and ferromagnetic body 172 may be oriented such that the magnetic force therebetween generates, or produces, a normal force between ferromagnetic body 172 and electrically conductive body 174. This normal force may generate a frictional force between ferromagnetic body 172 and electrically conductive body 174 during relative motion therebetween, and this frictional force also may resist the motion of attached component 40 relative to base structure 21.

Magnetically active body 170 may define any suitable form, shape, size, and/or conformation. The form, shape, size, conformation, and/or material of construction of magnetically active body 170 may be selected and/or based, at least in part, on a desired level of magnetic interaction between magnetic assembly 140 and magnetically active body 170, a desired magnitude of a magnetic force between magnetic assembly 140 and magnetically active body 170, and/or on a desired level of damping that may be produced by motion-damping system 100 when present within mechanical system 18.

When magnetically active body 170 includes ferromagnetic body 172, ferromagnetic body 172 may be formed from and/or may include any suitable ferromagnetic material. As illustrative, non-exclusive examples, ferromagnetic body 172 may include and/or be formed from iron, a ferrite, silicon-ferrite, an iron-cobalt-vanadium alloy, a nickel alloy, and/or a magnetic alloy.

In addition, and when magnetically active body 170 includes ferromagnetic body 172, magnetic assembly 140 and ferromagnetic body 172 may be located and/or oriented relative to one another such that a magnetic force therebetween attracts attached component 40 to base structure 21, attracts tubular structure 110 to base structure 21, and/or attracts tubular structure 110 to attached component 40. Additionally or alternatively, magnetic assembly 140 and ferromagnetic body 172 also may be located and/or oriented such that the magnetic force therebetween resists motion of attached component 40 relative to base structure 21 and/or damps the motion of attached component 40 relative to base structure 21.

When magnetically active body 170 includes electrically conductive body 174, electrically conductive body 174 may be formed from and/or may include any suitable electrically conductive material. As illustrative, non-exclusive examples, electrically conductive body 174 may include and/or be formed from a metal, copper, brass, bronze, and/or aluminum. Additionally or alternatively, electrically conductive body 174 may not be ferromagnetic and/or may not be formed from a ferromagnetic material. As such, electrically conductive body 174 may not, generally, be magnetically attracted to magnetic assembly 140.

In addition, and when magnetically active body 170 includes electrically conductive body 174, magnetic assembly 140 and electrically conductive body 174 may be located and/or oriented relative to one another such that an eddy current, which may be generated within electrically conductive body 174 by relative motion between electrically conductive body 174 and magnetic assembly 140, resists motion of attached component 40 relative to base structure 21 and/or damps the motion of attached component 40 relative to base structure 21.

When tubular structure 110 defines enclosed volume 114, enclosed volume 114 may include and/or contain a viscoelastic material 130. Viscoelastic material 130 may be located, sized, oriented, and/or affixed within enclosed volume 114 such that viscoelastic material 130 is deformed during motion of attached component 40 relative to base structure 21. This deformation of viscoelastic material 130 may dissipate energy, thereby damping the relative motion.

Illustrative, non-exclusive examples of viscoelastic material 130 include any suitable polymer, high density polyethylene, rubber, silicone, silicone rubber, and/or polyurethane. Viscoelastic material 130 may be (at least substantially) free of voids. Alternatively, viscoelastic material 130 may include and/or define one or more voids 132 therein. Voids 132, when present, may be located, selected, and/or sized to convey a desired amount of viscoelasticity to viscoelastic material 130. This may permit the viscoelasticity of viscoelastic material 130, and thus an amount of energy that may be dissipated via deformation of viscoelastic material 130, to be controlled, regulated, and/or selected to provide a desired level of damping by motion-damping system 100.

When tubular structure 110 defines enclosed volume 114, a selected one of magnetic assembly 140 and magnetically active body 170 may be located within enclosed volume 114, while the other of magnetic assembly 140 and magnetically active body 170 may be external to enclosed volume 114. Thus, and when enclosed volume 114 contains viscoelastic material 130, viscoelastic material 130 may be in contact with, in direct contact with, in physical contact with, in direct physical contact with, attached to, affixed to, and/or operatively affixed to inner surface 113 and also to the selected one of magnetic assembly 140 and magnetically active body 170. Thus, motion of the selected one of magnetic assembly 140 and magnetically active body 170 relative to tubular structure 110 during motion of attached component 40 relative to base structure 21 may produce the deformation of viscoelastic material 130, thereby dissipating energy and resisting and/or damping the relative motion.

As illustrated in dashed lines in FIG. 2, mechanical system 18 and/or motion-damping system 100 thereof may include one or more mounting structures 112. Mounting structures 112 may be configured to operatively affix tubular structure 110 to base structure 21 or to attached component 40, thereby restricting relative motion between tubular structure 110 and base structure 21 or attached component 40. As an illustrative, non-exclusive example, and as discussed, one of magnetic assembly 140 and magnetically active body 170 may be operatively affixed to the selected one of base structure 21 and attached component 40, and mounting structure 112 may operatively affix tubular structure 110 to the other of base structure 21 and attached component 40. As another illustrative, non-exclusive example, mounting structure 112 may not operatively affix tubular structure 110 to the selected one of base structure 21 and attached component 40. Illustrative, non-exclusive examples of mounting structures 112 include any suitable adhesive and/or fastener.

As discussed, motion-damping system 100 includes at least one magnetic assembly 140 and at least one magnetically active body 170. As an illustrative, non-exclusive example, motion-damping system 100 may include two magnetic assemblies 140, such as a first magnetic assembly and a second magnetic assembly. In addition, motion-damping system 100 also may include two magnetically active bodies 170, such as a first magnetically active body and a second magnetically active body.

When motion-damping system 100 includes two magnetic assemblies 140 and two magnetically active bodies 170, the first magnetic assembly and the first magnetically active body may be oriented such that a first magnetic interaction therebetween resists relative motion between tubular structure 110 and base structure 21 and/or retains tubular structure 110 in contact with base structure 21. Thus, the first magnetic assembly may be oriented adjacent to and/or in magnetic communication with the first magnetically active body.

In addition, the second magnetic assembly and the second magnetically active body may be oriented such that a second magnetic interaction therebetween resists relative motion between tubular structure 110 and attached component 40 and/or retains tubular structure 110 in contact with attached component 40. Thus, the second magnetic assembly may be oriented adjacent to and/or in magnetic communication with the second magnetically active body. Under these conditions, motion-damping system 100 may not include, or may not be required to include, mounting structure 112.

Tubular structure 110 may define any suitable shape, profile, and/or cross-sectional shape. As illustrative, non-exclusive examples, tubular structure 110 may define a tubular shape and/or a hollow cylindrical shape. As additional illustrative, non-exclusive examples, tubular structure 110 may define a circular cross-sectional shape, an at least substantially circular cross-sectional shape, and/or a non-circular cross-sectional shape. As yet another illustrative, non-exclusive example, tubular structure 110 may include and/or be an elongate tubular structure that defines a longitudinal axis that is (at least substantially) parallel to gap 80. Additionally or alternatively, and when attached component 40 is configured to rotate relative to base structure 21, the longitudinal axis may be at least substantially parallel to (or may be) a hinge axis for rotational relative motion (i.e., a rotation 60) between base structure 21 and attached component 40.

Tubular structure 110 may include and/or be formed from any suitable material. As an illustrative, non-exclusive example, tubular structure 110 may be formed from a rigid, or at least substantially rigid, material. Thus, tubular structure 110 also may be referred to herein as a rigid tubular structure 110 and/or as an at least substantially rigid tubular structure 110. Additional illustrative, non-exclusive examples of a material of construction of tubular structure 110 include any suitable metallic material, composite material, and/or fiberglass-epoxy composite material. When tubular structure 110 is formed from the rigid, or at least substantially rigid, material, the rigid material may be selected such that tubular structure 110 is not deformed, or is at least substantially undeformed, during motion of attached component 40 relative to base structure 21.

At least a portion of tubular structure 110 may be formed from, may be reinforced by, and/or may include a woven material. The woven material may increase a durability and/or an abrasion resistance of tubular structure 110, thereby increasing a service life thereof. Illustrative, non-exclusive examples of the woven material include a glass fiber, an e-glass, a carbon fiber, a polymer, a polymer fiber, and/or a poly-paraphelylene terephthalamide.

Magnetic assembly 140 may include any suitable structure that may generate and/or produce the magnetic interaction between magnetic assembly 140 and magnetically active body 170. As an illustrative, non-exclusive example, magnetic assembly 140 may include one or more magnets 142. Illustrative, non-exclusive examples of magnets 142 include any suitable permanent magnet, superconducting magnet, and/or electromagnet. Illustrative, non-exclusive examples of the permanent magnet include a neodymium permanent magnet (i.e., a NdFeB permanent magnet), a Samarium-Cobalt permanent magnet (i.e., a SmCo permanent magnet), and/or a ferrite permanent magnet.

When magnetic assembly 140 includes the plurality of magnets 142, the plurality of magnets 142 may define any suitable orientation relative to one another, relative to gap 80, relative to tubular structure 110, and/or relative to magnetically active body 170. Illustrative, non-non-exclusive examples of suitable relative orientations are discussed in more detail herein.

In addition, and when magnetic assembly 140 includes the plurality of magnets 142, magnetic assembly 140 also may include one or more ferromagnetic flux return bars 144 and/or one or more electrical insulators 146. Ferromagnetic flux return bars 144, when present, may extend between oppositely polarized poles of two magnets 142. This may increase a magnitude of a magnetic force between the two magnets and magnetically active body 170. Electrical insulators 146, when present, may electrically separate a first portion of the plurality of magnets 142 from a second portion of the plurality of magnets 142. This may prevent an electric current, such as may be generated by lightening striking mechanical system 18, from propagating along a length of magnetic assembly 140. More specific but still illustrative, non-exclusive examples of ferromagnetic flux return bars 144 and/or of electrical insulators 146, and configurations thereof, are discussed herein.

Ferromagnetic flux return bar 144 may include and/or be formed from any suitable material. As illustrative, non-exclusive examples, ferromagnetic flux return bar 144 may include and/or be formed from a ferromagnetic material, iron, a ferrite, a silicon-ferrite, an iron-cobalt-vanadium alloy, a nickel alloy, and/or a magnetic alloy. In addition, ferromagnetic flux return bar 144 also may define any suitable shape. As an illustrative, non-exclusive example, ferromagnetic flux return bar 144 may define a planar, or at least substantially planar, shape. As another illustrative, non-exclusive example, ferromagnetic flux return bar 144 may define a nonplanar, or nonlinear, shape. When ferromagnetic flux return bar 144 is nonlinear, a conformation of the ferromagnetic flux return bar may be selected to increase a magnetic interaction between magnetic assembly 140 (or magnets 142 thereof) and magnetically active body 170.

Base structure 21 may include any suitable structure that may be operatively attached to attached component 40. As illustrative, non-exclusive examples, base structure 21 may include and/or be a vehicle, an automobile, a portion of an automobile, a train, a portion of a train, an aircraft, a portion of an aircraft, a wing of an aircraft, a horizontal stabilizer of an aircraft, and/or a vertical stabilizer of an aircraft.

Attached component 40 may include any suitable structure that may be attached to base structure 21 and/or that may be moved relative to base structure 21. As illustrative, non-exclusive examples, attached component 40 may include and/or be a window, a hood, a door, a trunk, a flap, a main landing gear door, a nose landing gear door, a rudder, an elevator, a slat, an aileron, and/or a spoiler.

Figure 3:
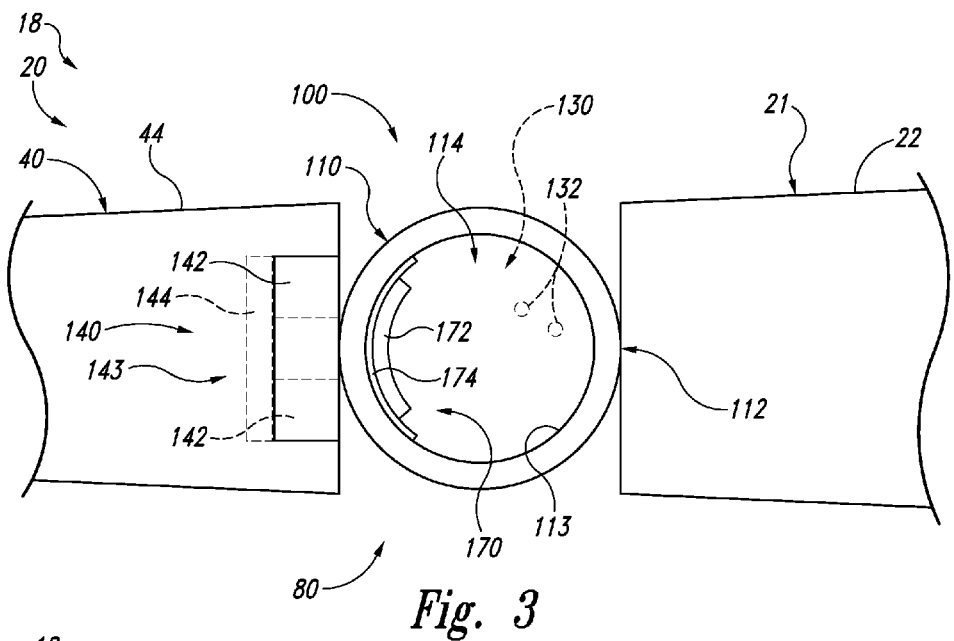
FIG. 3 is a schematic cross-sectional view of illustrative, non-exclusive examples of a motion-damping system according to the present disclosure.

FIG. 3 is a schematic cross-sectional view of illustrative, non-exclusive examples of a motion-damping system 100 according to the present disclosure that may form a portion of a mechanical system 18. In FIG. 3, mechanical system 18 is an aircraft 20 (such as aircraft 20 of FIGS. 1-2), base structure 21 is a wing 22 of aircraft 20, and attached component 40 is a flap 44 of aircraft 20, with the wing and the flap defining a gap 80 therebetween. However, motion-damping system 100 of FIG. 3 is not limited to this embodiment.

As illustrated, motion-damping system 100 includes a tubular structure 110 that is located within gap 80 and that extends between base structure 21 and attached component 40. Tubular structure 110 is operatively affixed to base structure 21 via a mounting structure 112. Tubular structure 110 defines an enclosed volume 114 and has a generally hollow cylindrical shape. Enclosed volume 114 may contain a viscoelastic material 130, which may define a plurality of voids 132 therein. Enclosed volume 114 further contains a magnetically active body 170, which includes a ferromagnetic body 172 and an electrically conductive body 174.

Motion-damping system 100 also includes a magnetic assembly 140. Magnetic assembly 140 is operatively affixed to attached component 40. As illustrated, magnetic assembly 140 and magnetically active body 170 are oriented to permit magnetic interaction therebetween. In addition, electrically conductive body 174 is located between ferromagnetic body 172 and magnetic assembly 140.

Magnetic assemblies 140 may include a single magnet 142 or a plurality of magnets 142. Magnets 142 may define a north pole and a south pole. When magnetic assembly 140 includes a single magnet 142, the single magnet may be oriented such that both the north pole and the south pole thereof are directed generally toward magnetically active body 170. Alternatively, the single magnet also may be oriented such that one of the north pole and the south pole is directed generally toward magnetically active body 170, with the other of the north pole and the south pole being directed generally away from magnetically active body 170. Alternatively, the north pole and/or the south pole may be directed generally transverse magnetically active body 170, transverse to a line that extends between magnetic assembly 140 and magnetically active body 170, and/or transverse to any other portion of motion-damping system 100.

When magnetic assemblies 140 include a plurality of magnets 142, the magnets may be arranged in pairs 143 of magnets 142, and magnetic assembly 140 also may include a ferromagnetic flux return bar 144. Under these conditions, a first north pole of a first magnet 142 of the pair 143 of magnets 142 may be oriented generally toward magnetically active body 170 and/or away from ferromagnetic flux return bar 144. In addition, a second south pole of a second magnet 142 may be oriented generally toward magnetically active body 170 and/or away from ferromagnetic flux return bar 144.

Furthermore, the first south pole of first magnet 142 may be directed generally toward ferromagnetic flux return bar 144 and/or away from the magnetically active body 170. In addition, the second north pole of second magnet 142 may be directed generally toward ferromagnetic flux return bar 144 and/or away from magnetically active body 170. Thus, ferromagnetic flux return bar 144 may extend generally between the first south pole and the second north pole.

Magnetic assembly 140 of FIG. 3 is illustrated as optionally including a single pair 143 of magnets 142. However, it is within the scope of the present disclosure that magnetic assemblies 140 may include a plurality of pairs 143 of magnets 142, as discussed in more detail herein.

As discussed, motion-damping system 100 may damp relative motion between base structure 21 and attached component 40 utilizing a variety of damping (or energy dissipating) mechanisms. As an illustrative, non-exclusive example, and with reference to FIG. 3, motion of attached component 40 relative to base structure 21 may cause magnetic assembly 140 to translate relative to electrically conductive body 174. This may generate eddy currents within electrically conductive body 174, and these eddy currents may dissipate energy and resist, or damp, the relative motion. As another illustrative, non-exclusive example, a magnetic force between ferromagnetic body 172 and magnetic assembly 140 may resist, or damp, the relative motion.

As yet another illustrative, non-exclusive example, ferromagnetic body 172 may be in contact with electrically conductive body 174 but may not be operatively affixed to electrically conductive body 174. Under these conditions, the magnetic force between ferromagnetic body 172 and magnetic assembly 140 during motion of attached component 40 relative to base structure 21 may cause ferromagnetic body 172 to translate and/or rotate within internal volume 114 and/or to slide against electrically conductive body 174. This sliding may dissipate energy and resist, or damp, the relative motion due to frictional forces between ferromagnetic body 172 and electrically conductive body 174, as discussed herein.

As another illustrative, non-exclusive example, and when viscoelastic material 130 is present within internal volume 114, viscoelastic material 130 may be operatively affixed to a portion of an inner surface 113 of tubular structure 110 and also to ferromagnetic body 172. Under these conditions, motion of ferromagnetic body 172 within internal volume 114, such as discussed herein, may produce deformation of viscoelastic material 130. This deformation may dissipate energy and resist, or damp, relative motion between attached component 40 and base structure 21.

Figure 4:
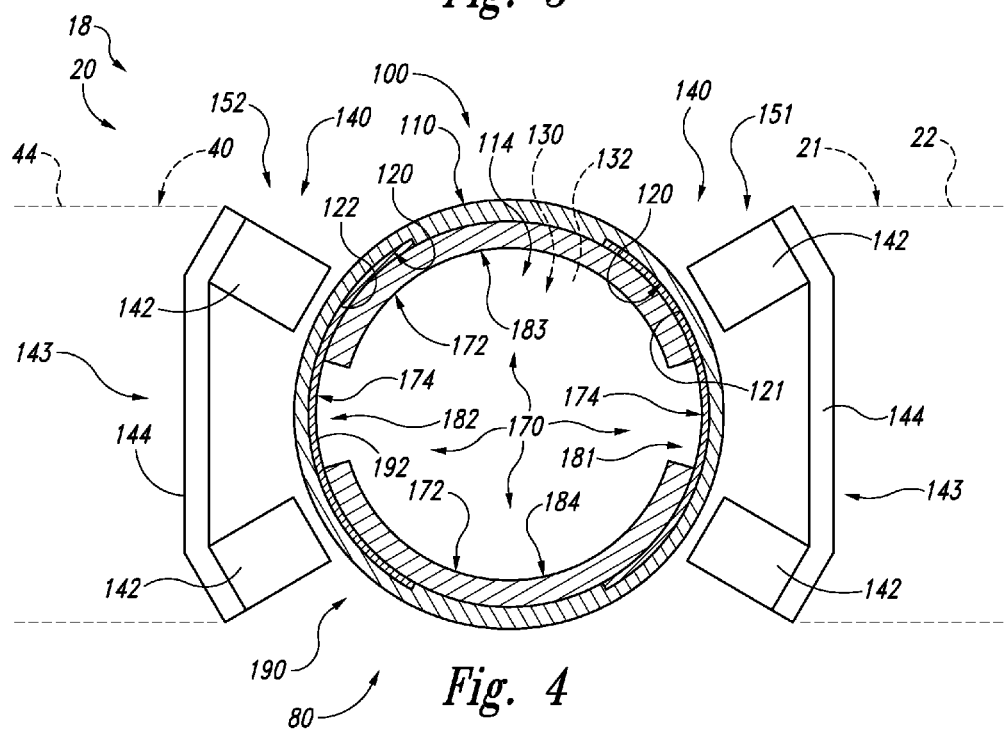
FIG. 4 is another schematic representation of illustrative, non-exclusive examples of a motion-damping system according to the present disclosure.

FIG. 4 is another schematic representation of illustrative, non-exclusive examples of a motion-damping system 100 according to the present disclosure that may form a portion of a mechanical system 18. In FIG. 4, and similar to FIG. 3, mechanical system 18 is an aircraft 20, base structure 21 is a wing 22 of aircraft 20, and attached component 40 is a flap 44 of aircraft 20 (such as aircraft 20 of FIGS. 1-2), with wing 22 and the flap 44 defining a gap 80 therebetween. However, motion-damping system 100 of FIG. 4 is not limited to this embodiment.

In FIG. 4 motion-damping system 100 includes a tubular structure 110. Tubular structure 110 defines an enclosed volume 114 that may contain a viscoelastic material 130. A plurality of magnetically active bodies 170 is located within enclosed volume 114 and includes a first magnetically active body 181 and a second magnetically active body 182.

Motion-damping system 100 further includes a plurality of magnetic assemblies 140, including a first magnetic assembly 151 and a second magnetic assembly 152. First magnetic assembly 151 is operatively affixed to base structure 21, and second magnetic assembly 152 is operatively affixed to attached component 40. Each magnetic assembly 140 includes a pair 143 of magnets 142 and a ferromagnetic flux return bar 144. It is within the scope of the present disclosure that a polarity of first magnetic assembly 151 may be (at least substantially) aligned with a polarity of second magnetic assembly 152. Alternatively it is also within the scope of the present disclosure that the polarity of first magnetic assembly 151 may be (at least substantially) opposed to the polarity of second magnetic assembly 152.

First magnetic assembly 151 and first magnetically active body 181 are oriented such that a first magnetic interaction therebetween resists, or damps, relative motion between first magnetic assembly 151 and first magnetically active body 181 (or between tubular structure 110 and base structure 21). Similarly, second magnetic assembly 152 and second magnetically active body 182 are oriented such that a second magnetic interaction therebetween resists, or damps, relative motion between second magnetic assembly 152 and second magnetically active body 182 (or between tubular structure 110 and attached component 40).

First magnetically active body 181 may include an electrically conductive body 174 and also may be referred to herein as a first electrically conductive body 181. Similarly, second magnetically active body 182 may include an electrically conductive body 174 and also may be referred to herein as a second electrically conductive body 182. First electrically conductive body 181 may be spaced apart from second electrically conductive body 182 within internal volume 114.

Tubular structure 110 may define a plurality of recessed regions 120, including a first recessed region 121 and a second recessed region 122. A corresponding electrically conductive body 174 may be located within each recessed region 120 to define a composite structure 190, which includes tubular structure 110 and electrically conductive bodies 174. Composite structure 190 may define an inner surface 192 that defines a circular, or at least substantially circular, internal diameter for composite structure 190.

As illustrated in FIG. 4, the plurality of magnetically active bodies 170 further may include a third magnetically active body 183 and a fourth magnetically active body 184. Third magnetically active body 183 may include a ferromagnetic body 172 and also may be referred to herein as a first ferromagnetic body 183. Similarly, fourth magnetically active body 184 may include a ferromagnetic body 172 and also may be referred to herein as a second ferromagnetic body 184. First ferromagnetic body 183 may be spaced apart from second ferromagnetic body 184 within internal volume 114.

As also illustrated in FIG. 4, first electrically conductive body 181 may extend, or be located, between first ferromagnetic body 183 and first magnetic assembly 151 and/or between second ferromagnetic body 184 and first magnetic assembly 151. Similarly, second electrically conductive body 182 may be located between first ferromagnetic body 183 and second magnetic assembly 152 and/or between second ferromagnetic body 184 and second magnetic assembly 152. In addition, first ferromagnetic body 183 may be in (direct) physical contact with first electrically conductive body 181 and/or with second electrically conductive body 182. Second ferromagnetic body 184 also may be in (direct) physical contact with first electrically conductive body 181 and/or with second electrically conductive body 182.

First ferromagnetic body 183 and second ferromagnetic body 184 may be configured to slide along inner surface 192 of composite structure 190 during motion of attached component 40 relative to base structure 21. In addition, first ferromagnetic body 183 and first magnetic assembly 151 may be oriented such that a first magnetic force therebetween compresses first electrically conductive body 181 and/or generates a first normal force between first ferromagnetic body 183 and first electrically conductive body 181. Similarly, second ferromagnetic body 184 and first magnetic assembly 151 may be oriented such that a second magnetic force therebetween compresses first electrically conductive body 181 and/or generates a second normal force between second ferromagnetic body 184 and first electrically conductive body 181.

In addition, first ferromagnetic body 183 and second magnetic assembly 152 may be oriented such that a third magnetic force therebetween compresses second electrically conductive body 182 and/or generates a third normal force between first ferromagnetic body 183 and second electrically conductive body 182. Similarly, second ferromagnetic body 184 and second magnetic assembly 152 may be oriented such that a fourth magnetic force therebetween compresses second electrically conductive body 182 and/or generates a fourth normal force between second ferromagnetic body 184 and second electrically conductive body 182.

In operation, the normal forces may produce frictional forces between ferromagnetic bodies 172 and electrically conductive bodies 174. These frictional forces may dissipate energy, thereby resisting, or damping, relative motion between attached component 40 and base structure 21. In addition, the relative motion may generate eddy currents within electrically conductive bodies 174. These eddy currents also may dissipate energy, thereby resisting, or damping, the relative motion. Furthermore, and when internal volume 114 includes viscoelastic material 130, motion of first ferromagnetic body 183 and/or second ferromagnetic body 184 within internal volume 114 due to the relative motion between attached component 40 and base structure 21 may produce deformation of viscoelastic material 130. This deformation also may dissipate energy, thereby resisting, or damping, the relative motion.

Figure 5:
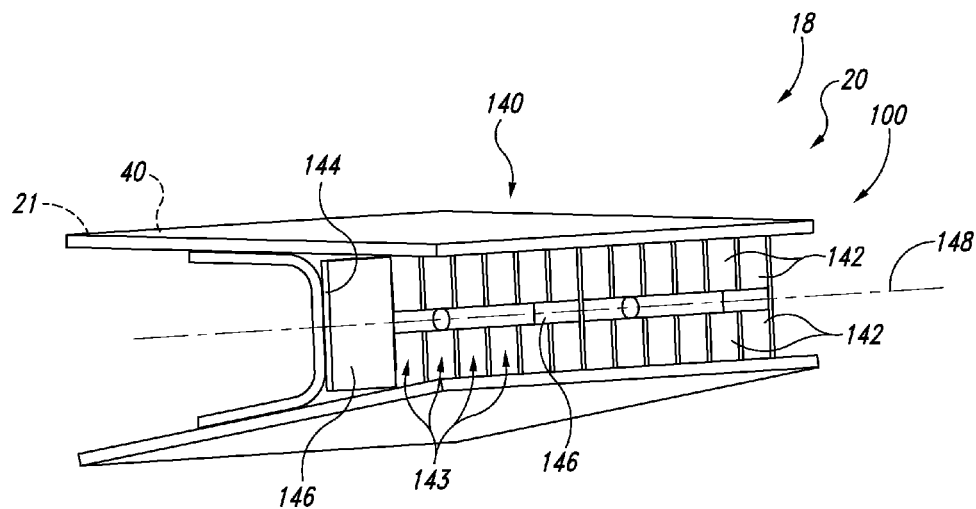
FIG. 5 is a schematic representation of illustrative, non-exclusive examples of a portion of a motion-damping system according to the present disclosure.

FIG. 5 is another schematic representation of illustrative, non-exclusive examples of a portion of a motion-damping system 100 according to the present disclosure. Specifically, FIG. 5 provides an illustrative, non-exclusive example of a configuration of a magnetic assembly 140 that may form a portion of motion-damping system 100.

In FIG. 5, magnetic assembly 140 includes a plurality of magnets 142 that are arranged to form a plurality of pairs 143 of magnets 142. Each of the plurality of pairs 143 of magnets 142 includes, is associated with, and/or is in magnetic communication with a ferromagnetic flux return bar 144. In addition, each pair 143 of magnets 142 includes a first magnet that defines a first south pole that is directed generally toward ferromagnetic flux return bar 144 and a second magnet that defines a second north pole that is directed generally toward ferromagnetic flux return bar 144. Thus, each pair 143 of magnets 142 includes a first north pole that is directed generally away from ferromagnetic flux return bar 144 and a second south pole that is directed generally away from ferromagnetic flux return bar 144.

In the illustrative, non-exclusive example of FIG. 5, each pair 143 in the plurality of pairs 143 of magnets 142 is aligned beside one or more adjacent pairs 143 to define a longitudinal axis 148 of magnetic assembly 140. This longitudinal axis may be parallel to and/or may be a longitudinal axis of a gap that is defined between a base structure 21 and an attached component 40 when magnetic assembly 100 is assembled within a mechanical system (such as mechanical system 18 of FIGS. 1-4). It is within the scope of the present disclosure that a polarity of a given pair 143 of magnets 142 may be (at least substantially) the same as a polarity of an adjacent pair 143 of magnets 142 within magnetic assembly 140. Alternatively, it is also within the scope of the present disclosure that the polarity of the given pair 143 of magnets 142 may be (at least substantially) opposed to the polarity of the adjacent pair 143 of magnets 142 within magnetic assembly 140.

FIG. 5 also illustrates that magnetic assembly 140 further may include one or more electrical insulators 146. Electrical insulators 146 may extend between a given pair 143 of magnets and an adjacent pair 143 of magnets, thereby resisting a flow of electric current therebetween, as discussed in more detail herein.

Figure 6:
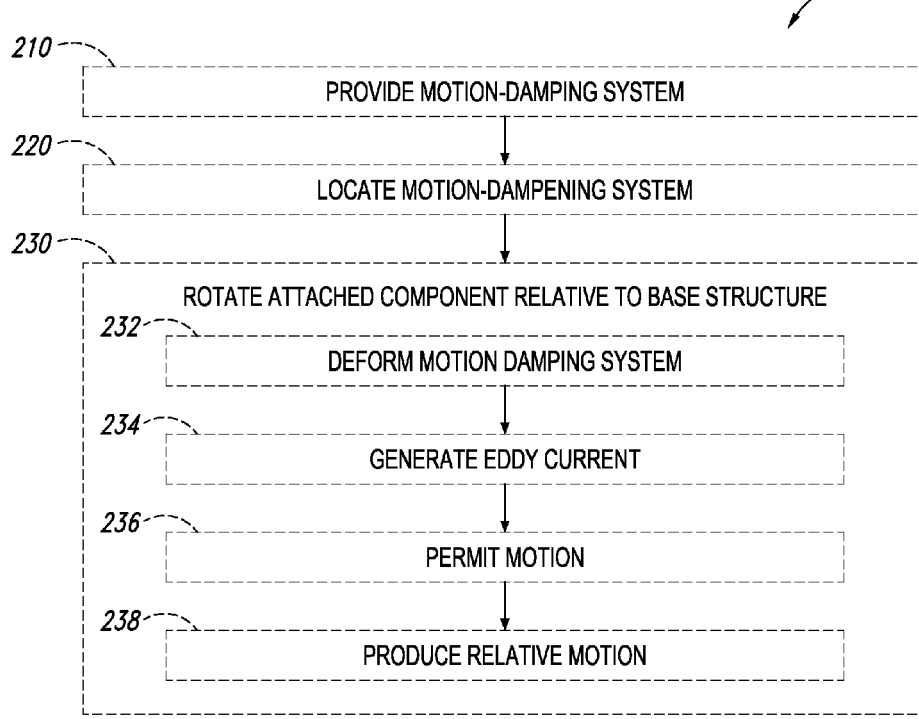
FIG. 6 is a flowchart depicting methods according to the present disclosure of damping motion between a base structure and an attached component.

FIG. 6 is a flowchart depicting methods 200 according to the present disclosure of damping motion between a base structure and an attached component. Methods 200 may include providing a motion-damping system at 210 and/or locating the motion-damping system within a gap that is defined between a base structure and an attached component at 220. Methods 200 further may include rotating the attached component relative to the base structure at 230.

Providing the motion-damping system at 210 may include providing any suitable motion-damping system. As an illustrative, non-exclusive example, the providing at 210 may include providing motion-damping system 100 of FIGS. 1-5. It is within the scope of the present disclosure that the providing at 210 may include fabricating the motion-damping system, constructing the motion-damping system, purchasing the motion-damping system, ordering the motion-damping system, and/or otherwise obtaining the motion-damping system in any suitable manner and/or from any suitable source such that the motion-damping system may be utilized during the locating at 220.

Locating the motion-damping system within the gap that is defined between the base structure and the attached component at 220 may include locating the motion-damping system in any suitable manner. As an illustrative, non-exclusive example, the locating at 220 may include locating such that a tubular structure of the motion-damping system extends between and/or is in physical contact with the base structure and the attached component. Illustrative, non-exclusive examples of orientations and/or conformations for the motion-damping system within the gap are discussed herein with reference to FIGS. 2-5.

Rotating the attached component relative to the base structure at 230 may include rotating the attached component in any suitable manner. As an illustrative, non-exclusive example, the rotating at 230 may include pivoting the attached component relative to the base structure.

It is within the scope of the present disclosure that the rotating at 230 may include deforming, at 232, a portion of the motion-damping system. As an illustrative, non-exclusive example, the motion-damping system may include a viscoelastic material, and the deforming at 232 may include deforming the viscoelastic material. Illustrative, non-exclusive examples of the viscoelastic material and/or of locations thereof within the motion-damping system are discussed herein. As discussed, deformation of the viscoelastic material may dissipate energy, thereby resisting, or damping, the rotating at 230.

Additionally or alternatively, it is also within the scope of the present disclosure that the moving at 230 may include generating, at 234, an eddy current within an electrically conductive body and/or within a ferromagnetic body that forms a portion of the motion-damping system. When methods 200 include the generating at 234, the eddy current may dissipate energy, thereby resisting, or damping, motion of the attached component relative to the base structure. Illustrative, non-exclusive examples of the electrically conductive body are discussed herein with reference to electrically conductive body 174 of FIGS. 2-4. Illustrative, non-exclusive examples of the ferromagnetic body are discussed herein with reference to magnetically active body 170 of FIGS. 2-4.

It is also within the scope of the present disclosure that the moving at 230 may include permitting, at 236, the tubular structure to move relative to the base structure and/or relative to the attached component. As an illustrative, non-exclusive example, the permitting at 236 may include permitting the tubular structure to move, slip, and/or slide relative to the base structure and/or relative to the attached component.

The motion-damping system may include the electrically conductive body and the ferromagnetic body. Under these conditions, the rotating at 230 further may include producing, at 238, a relative motion between the electrically conductive body and the ferromagnetic body. As an illustrative, non-exclusive example, the producing at 238 may include rotating, sliding, and/or translating the ferromagnetic body and the electromagnetic body relative to one another. As another illustrative, non-exclusive example, the producing at 238 may include sliding one of the ferromagnetic body and the electrically conductive body against, or relative to, the other of the ferromagnetic body and the electrically conductive body. The producing at 238 may be resisted by a frictional force between the electrically conductive body and the ferromagnetic body, and this frictional force may dissipate energy, thereby resisting, or damping, the rotating at 230.

Illustrative, non-exclusive examples of inventive subject matter according to the present disclosure are described in the following enumerated paragraphs:

A1. A motion-damping system that is configured to damp relative motion between a base structure and an attached component, the system comprising:

an at least substantially rigid tubular structure that defines an internal volume, wherein the base structure and the attached component define a gap therebetween, and further wherein the tubular structure extends within the gap;

a magnetic assembly; and a magnetically active body, wherein:

(i) one of the magnetic assembly and the magnetically active body is located within the tubular structure;

(ii) the other of the magnetic assembly and the magnetically active body is operatively attached to a selected one of the base structure and the attached component; and (iii) the magnetic assembly is in magnetic communication with the magnetically active body such that a magnetic interaction therebetween resists motion of the attached component relative to the base structure.

A2. The system of paragraph A1, wherein the magnetically active body is oriented adjacent to and in magnetic communication with the magnetic assembly.

A3. The system of any of paragraphs A1-A2, wherein at least a portion, and optionally all, of the magnetically active body is at least one of:

(i) located within the internal volume of the tubular structure; and (ii) defined by the tubular structure.

A4. The system of any of paragraphs A1-A2, wherein at least a portion, and optionally all, of the magnetically active body is operatively affixed to the selected one of the base structure and the attached component.

A5. The system of any of paragraphs A1-A4, wherein the magnetically active body includes a ferromagnetic body that is formed from a ferromagnetic material.

A6. The system of paragraph A5, wherein the ferromagnetic material includes at least one of iron, a ferrite, silicon-ferrite, an iron-cobalt-vanadium alloy, a nickel alloy, and a magnetic alloy.

A7. The system of any of paragraphs A5-A6, wherein the magnetic assembly and the ferromagnetic body are oriented such that a magnetic force therebetween attracts the attached component and the base structure to one another.

A8. The system of any of paragraphs A5-A7, wherein the magnetic assembly and the ferromagnetic body are oriented such that a/the magnetic force therebetween resists motion of the attached component relative to the base structure.

A9. The system of any of paragraphs A1-A8, wherein the magnetically active body includes an electrically conductive body that is formed from an electrically conductive material.

A10. The system of paragraph A9, wherein the electrically conductive material includes at least one of a metal, copper, brass, bronze, and aluminum.

A11. The system of any of paragraphs A9-A10, wherein the electrically conductive material is not ferromagnetic.

A12. The system of any of paragraphs A9-A11, wherein the magnetic assembly and the electrically conductive body are oriented such that an eddy current generated within the electrically conductive body by relative motion between the electrically conductive body and the magnetic assembly resists motion of the attached component relative to the base structure.

A13. The system of any of paragraphs A9-A12, wherein the tubular structure defines an inner surface, and further wherein the electrically conductive body is operatively affixed to the inner surface.

A14. The system of any of paragraphs A9-A13, wherein the tubular structure defines a recessed region, the electrically conductive body is located within the recessed region, and further wherein the tubular structure and the electrically conductive body together define a composite structure that defines an inner surface that defines an at least substantially circular internal diameter.

A15. The system of any of paragraphs A1-A14, wherein the magnetically active body includes a/the ferromagnetic body and a/the electrically conductive body.

A16. The system of paragraph A15, wherein the electrically conductive body is located between the ferromagnetic body and the magnetic assembly.

A17. The system of any of paragraphs A15-A16, wherein the ferromagnetic body is positioned to slide against the electrically conductive body during motion of the attached component relative to the base structure.

A18. The system of any of paragraphs A15-A17, wherein the magnetic assembly and the ferromagnetic body are oriented such that a magnetic force therebetween generates a normal force between the ferromagnetic body and the electrically conductive body, and further wherein the normal force generates a frictional force between the ferromagnetic body and the electrically conductive body that resists motion of the attached component relative to the base structure.

A19. The system of any of paragraphs A15-A18, wherein the tubular structure defines the electrically conductive body.

A20. The system of any of paragraphs A1-A19, wherein the tubular structure is a rigid tubular structure.

A21. The system of any of paragraphs A1-A20, wherein the tubular structure is formed from at least one of a metallic material, a composite material, and a fiberglass-epoxy composite material.

A22. The system of any of paragraphs A1-A21, wherein the tubular structure is at least substantially undeformed during motion of the attached component relative to the base structure.

A23. The system of any of paragraphs A1-A22, wherein the tubular structure defines an at least substantially cylindrical shape.

A24. The system of any of paragraphs A1-A23, wherein the tubular structure defines a longitudinal axis that is at least substantially parallel to the gap.

A25. The system of paragraph A24, wherein the longitudinal axis is at least substantially parallel to, and optionally is, a hinge axis for rotational relative motion between the base structure and the attached component.

A26. The system of any of paragraphs A1-A25, wherein the system further includes a viscoelastic material that is located within the internal volume of the tubular structure.

A27. The system of paragraph A26, wherein the viscoelastic material is operatively affixed to the one of the magnetic assembly and the magnetically active body.

A28. The system of any of paragraphs A26-A27, wherein the viscoelastic material is operatively affixed to at least a portion of a/the inner surface of the tubular structure.

A29. The system of any of paragraphs A26-A28, wherein the viscoelastic material is in physical contact with the one of the magnetic assembly and the magnetically active body.

A30. The system of any of paragraphs A26-A29, wherein the magnetically active body is located within the internal volume of the tubular structure and includes a/the ferromagnetic body and a/the electrically conductive body, and further wherein the viscoelastic material is operatively attached to the ferromagnetic body.

A31. The system of any of paragraphs A26-A30, wherein the viscoelastic material includes at least one of a polymer, high density polyethylene, rubber, silicone rubber, and polyurethane.

A32. The system of any of paragraphs A26-A31, wherein the viscoelastic material defines a plurality of voids.

A33. The system of any of paragraphs A26-A32, wherein motion of the attached component relative to the base structure deforms the viscoelastic material, and further wherein the viscoelastic material is selected to dissipate energy during deformation to resist motion of the attached component relative to the base structure.

A34. The system of any of paragraphs A1-A33, wherein the magnetic assembly includes at least one of a permanent magnet, a superconducting magnet, and an electromagnet.

A35. The system of any of paragraphs A1-A34, wherein the magnetic assembly includes a permanent magnet, optionally wherein the permanent magnet includes at least one of a NdFeB permanent magnet, a SmCo permanent magnet, and a ferrite permanent magnet.

A36. The system of any of paragraphs A1-A35, wherein the magnetic assembly includes a magnet that defines a north pole and a south pole.

A37. The system of paragraph A36, wherein the magnet is oriented such that at least one, and optionally both, of the north pole and the south pole are directed (at least substantially) toward the magnetically active body.

A38. The system of paragraph A36, wherein the magnet is oriented such that one of the north pole and the south pole is directed (at least substantially) toward the magnetically active body and the other of the north pole and the south pole is directed (at least substantially) away from the magnetically active body.

A39. The system of any of paragraphs A1-A38, wherein the magnetic assembly includes a pair of magnets, which includes a first magnet and a second magnet, wherein a first north pole of the first magnet is directed (at least substantially) toward the magnetically active body, wherein a first south pole of the first magnet is directed (at least substantially) away from the magnetically active body, wherein a second north pole of the second magnet is directed (at least substantially) away from the magnetically active body, and further wherein a second south pole of the second magnet is directed (at least substantially) toward the magnetically active body.

A40. The system of paragraph A39, wherein the magnetic assembly further includes a ferromagnetic flux return bar, wherein the ferromagnetic flux return bar extends between the first south pole and the second north pole.

A41. The system of paragraph A40, wherein the ferromagnetic flux return bar is formed from a ferromagnetic material.

A42. The system of any of paragraphs A40-A41, wherein the ferromagnetic flux return bar is an at least substantially planar ferromagnetic flux return bar.

A43. The system of any of paragraphs A40-A41, wherein the ferromagnetic flux return bar is nonplanar, and further wherein a conformation of the ferromagnetic flux return bar is selected to increase the magnetic interaction between the magnetic assembly and the magnetically active body.

A44. The system of any of paragraphs A1-A43, wherein the magnetic assembly includes a plurality of pairs of magnets.

A45. The system of paragraph A44, wherein each of the plurality of pairs of magnets includes a corresponding ferromagnetic flux return bar.

A46. The system of any of paragraphs A44-A45, wherein the plurality of pairs of magnets is aligned along a longitudinal axis of the gap.

A47. The system of any of paragraphs A44-A45, wherein a polarity of a given pair of magnets of the plurality of pairs of magnets is the same as a polarity of an adjacent pair of magnets of the plurality of pairs of magnets.

A48. The system of any of paragraphs A44-A45, wherein a polarity of a given pair of magnets of the plurality of pairs of magnets is opposed to a polarity of an adjacent pair of magnets of the plurality of pairs of magnets.

A49. The system of any of paragraphs A44-A48, wherein an electrical insulator extends between a/the given pair of magnets of the plurality of pairs of magnets and a/the adjacent pair of magnets of the plurality of pairs of magnets.

A50. The system of any of paragraphs A1-A49, wherein the tubular structure is operatively affixed to one of the base structure and the attached component.

A51. The system of paragraph A50, wherein the system further includes a mounting structure that operatively affixes the tubular structure to the one of the base structure and the attached component.

A52. The system of any of paragraphs A50-A51, wherein the tubular structure is not affixed to the other of the base structure and the attached component.

A53. The system of any of paragraphs A50-A52, wherein:
(i) the magnetically active body is located within the internal volume of the tubular structure; and
(ii) the magnetic assembly is operatively affixed to the other of the base structure and the attached component.

A54. The system of any of paragraphs A1-A49, wherein the magnetic assembly is a first magnetic assembly and the motion-damping system further includes a second magnetic assembly, wherein the magnetically active body is a first magnetically active body and the motion-damping system further includes a second magnetically active body, wherein the first magnetic assembly and the first magnetically active body are oriented such that a first magnetic interaction therebetween resists relative motion between the first magnetic assembly and the first magnetically active body, and further wherein the second magnetic assembly and the second magnetically active body are oriented such that a second magnetic interaction therebetween resists relative motion between the second magnetic assembly and the second magnetically active body.

A55. The system of paragraph A54, wherein the first magnetic assembly is operatively affixed to the base structure, wherein the second magnetic assembly is operatively affixed to the attached component, wherein the first magnetically active body is located within the internal volume of the tubular structure, and further wherein the second magnetically active body is located within the internal volume of the tubular structure.

A56. The system of paragraph A55, wherein a polarity of the first magnetic assembly is at least substantially aligned to a polarity of the second magnetic assembly.

A57. The system of paragraph A55, wherein a polarity of the first magnetic assembly is at least substantially opposed to a polarity of the second magnetic assembly.

A58. The system of any of paragraphs A55-A57, wherein the first magnetically active body includes a first electrically conductive body, wherein the second magnetically active body includes a second electrically conductive body, and further wherein the system includes a third magnetically active body and a fourth magnetically active body, wherein the third magnetically active body includes a first ferromagnetic body, and further wherein the fourth magnetically active body includes a second ferromagnetic body.

A59. The system of paragraph A58, wherein the first electrically conductive body is spaced apart from the second electrically conductive body.

A60. The system of any of paragraphs A58-A59, wherein the first ferromagnetic body is spaced apart from the second ferromagnetic body.

A61. The system of any of paragraphs A58-A60, wherein the first electrically conductive body extends between the first ferromagnetic body and the first magnetic assembly.

A62. The system of any of paragraphs A58-A61, wherein the second electrically conductive body extends between the second ferromagnetic body and the second magnetic assembly.

A63. The system of any of paragraphs A58-A62, wherein the first ferromagnetic body is in physical contact with the first electrically conductive body, and optionally with the second electrically conductive body.

A64. The system of any of paragraphs A58-A63, wherein the second ferromagnetic body is in physical contact with the second electrically conductive body, and optionally with the first electrically conductive body.

A65. The system of any of paragraphs A58-A64, wherein the tubular structure defines a first recessed region and a second recessed region, wherein the first electrically conductive body is received within the first recessed region, wherein the second electrically conductive body is received within the second recessed region, and further wherein the tubular structure, the first electrically conductive body, and the second electrically conductive body together define a/the composite structure that defines an/the inner surface that defines an/the at least substantially circular internal diameter.

A66. The system of paragraph A65, wherein the first ferromagnetic body and the second ferromagnetic body are configured to slide along the inner surface during motion of the attached component relative to the base structure.

A67. The system of any of paragraphs A58-A66, wherein the first electrically conductive body is at least substantially opposed to the first magnetic assembly.

A68. The system of any of paragraphs A58-A67, wherein the second electrically conductive body is at least substantially opposed to the second magnetic assembly.

A69. The system of any of paragraphs A58-A68, wherein the first ferromagnetic body and the first magnetic assembly are oriented such that a first magnetic force therebetween compresses the first electrically conductive body, and optionally wherein the first ferromagnetic body and the second magnetic assembly are oriented such that a second magnetic force therebetween compresses the second electrically conductive body.

A70. The system of any of paragraphs A58-A69, wherein the second ferromagnetic body and the second magnetic assembly are oriented such that a third magnetic force therebetween compresses the second electrically conductive body, and optionally wherein the second ferromagnetic body and the first magnetic assembly are oriented such that a fourth magnetic force therebetween compresses the first electrically conductive body.

A71. The system of any of paragraphs A1-A70, wherein the motion-damping system is not a hydraulic motion-damping system.

A72. The system of any of paragraphs A1-A71, wherein the motion-damping system is not hydraulically powered.

A73. The system of any of paragraphs A1-A72, wherein the motion-damping system is not actively controlled.

A74. The system of any of paragraphs A1-A73, wherein the motion-damping system is not electrically powered.

A75. The system of any of paragraphs A1-A74, wherein the motion-damping system is a passive motion-damping system.

A76. The system of any of paragraphs A1-A75, wherein the motion-damping system damps at least one of vibration and flutter between the base structure and the attached component.

A77. The system of any of paragraphs A1-A76, wherein the magnetic assembly is located within the internal volume of the tubular structure, and further wherein the magnetically active body is operatively attached to the selected one of the base structure and the attached component.

A78. The system of paragraph A77, wherein the magnetic assembly is configured to translate within the internal volume of the tubular structure.

A79. The system of paragraph A77, wherein a location of the magnetic assembly is fixed with respect to the tubular structure.

A80. The system of any of paragraphs A1-A76, wherein the magnetic assembly is operatively attached to the selected one of the base structure and the attached component, and further wherein the magnetically active body is located within the internal volume of the tubular structure.

A81. The system of paragraph A80, wherein the magnetically active body is configured to translate within the internal volume of the tubular structure.

A82. The system of paragraph A80, wherein a location of the magnetically active body is fixed with respect to the tubular structure.

A81. A mechanical system, comprising:
a base structure;
an attached component, wherein the attached component is attached to the base structure and is configured to move relative to the base structure, and further wherein the base structure and the attached component define a gap therebetween; and
the motion-damping system of any of paragraphs A1-A82.

B2. The system of paragraph B1, wherein the base structure includes at least one of a vehicle, an automobile, a portion of an automobile, a train, a portion of a train, an aircraft, and a portion of an aircraft.

B3. The system of any of paragraphs B1-B2, wherein the attached component includes at least one of a window, a hood, a door, a trunk, a flap, a main landing gear door, a nose landing gear door, a rudder, an elevator, a slat, an aileron, and a spoiler.

C1. A method of damping motion between a base structure and an attached component, the method comprising:
providing the motion-damping system of any of paragraphs A1-A82; and
locating the motion-damping system within the gap that is defined between the base structure and the attached component such that the motion-damping system resists motion of the attached component relative to the base structure.

C2. The method of paragraph C1, wherein the method further includes rotating the attached component relative to the base structure.

C3. The method of paragraph C2, wherein the rotating includes generating an eddy current within an/the electrically conductive body that forms a portion of the motion-damping system.

C4. The method of paragraph C3, wherein the eddy current resists motion of the attached component relative to the base structure.

C5. The method of any of paragraphs C2-C4, wherein the rotating includes at least one of permitting the tubular structure to rotate relative to the base structure and permitting the tubular structure to rotate relative to the attached component.

C6. The method of any of paragraphs C2-C5, wherein the rotating includes deforming a/the viscoelastic material that is located within the internal volume of the tubular structure.

C7. The method of paragraph C6, wherein the deforming includes dissipating energy with the viscoelastic material during the deforming.

C8. The method of any of paragraphs C2-C7, wherein the magnetically active body includes a/the ferromagnetic body and a/the electrically conductive body, and further wherein the rotating includes sliding the ferromagnetic body against the electrically conductive body.

C9. The method of paragraph C8, wherein the sliding includes dissipating energy via a frictional force between the ferromagnetic body and the electrically conductive body.

D1. A method of damping motion between a base structure and an attached component with a motion-damping system that extends within a gap that is defined between the base structure and the attached component, wherein the motion-damping system includes a magnetic assembly and a magnetically active body, the method comprising:
  rotating the attached component relative to the base structure to rotate the magnetic assembly and the magnetically active body relative to one another; and
  dissipating energy with the motion-damping system.

D2. The method of paragraph D1, wherein the dissipating energy includes generating an eddy current within an electrically conductive body that forms a portion of the magnetically active body via a magnetic interaction between the magnetic assembly and the electrically conductive body.

D3. The method of paragraph D2, wherein the method further includes resisting motion of the attached component relative to the base structure with the eddy current.

D4. The method of any of paragraphs D1-D3, wherein the motion-damping system includes a tubular structure, wherein one of the magnetic assembly and the magnetically active body is located within the tubular structure, wherein the other of the magnetic assembly and the magnetically active body is operatively attached to a selected one of the base structure and the attached component, and further wherein the rotating includes permitting the tubular structure to rotate relative to the selected one of the base structure and the attached component.

D5. The method of paragraph D4, wherein the rotating includes deforming a viscoelastic material that is located within an internal volume of the tubular structure.

D6. The method of paragraph D5, wherein the deforming includes resisting motion of the attached component relative to the base structure with the viscoelastic material.

D7. The method of any of paragraphs D5-D6, wherein the dissipating energy includes dissipating energy via the deforming.

D8. The method of any of paragraphs D1-D7, wherein the magnetically active body includes a ferromagnetic body and an/the electrically conductive body, and further wherein the rotating includes sliding the ferromagnetic body against the electrically conductive body.

D9. The method of paragraph D8, wherein the dissipating energy includes dissipating energy via a frictional force that is generated between the ferromagnetic body and the electrically conductive body during the sliding.

D10. The method of paragraph D9, wherein the method further includes resisting motion of the attached component relative to the base structure with the frictional force.

D11. The method of any of paragraphs D1-D10, wherein the magnetically active body includes a/the ferromagnetic body, and further wherein the dissipating energy includes dissipating energy via a magnetic force between the magnetic assembly and the ferromagnetic body.

D12. The method of any of paragraphs D1-D11, wherein the motion-damping system includes the motion-damping system of any of paragraphs A1-A82.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of damping motion between a base structure and an attached component with a motion-damping system that extends within a gap that is defined between the base structure and the attached component, wherein the motion-damping system includes a magnetic assembly, a magnetically active body, and a tubular structure, wherein one of the magnetic assembly and the magnetically active body is located within the tubular structure, and further wherein the other of the magnetic assembly and the magnetically active body is operatively attached to a selected one of the base structure and the attached component, the method comprising:
  rotating the attached component relative to the base structure to rotate the magnetic assembly and the magnetically active body relative to one another, wherein the rotating includes permitting the tubular structure to rotate relative to the selected one of the base structure and the attached component, and further wherein the rotating includes deforming a viscoelastic material that is located within an internal volume of the tubular structure; and
  dissipating energy with the motion-damping system.

2. The method of claim 1, wherein the dissipating energy includes generating an eddy current within an electrically conductive body that forms a portion of the magnetically active body via a magnetic interaction between the magnetic assembly and the electrically conductive body.

3. The method of claim 2, wherein the method further includes resisting motion of the attached component relative to the base structure with the eddy current.

4. The method of claim 1, wherein the deforming includes resisting motion of the attached component relative to the base structure with the viscoelastic material.

5. The method of claim 1, wherein the dissipating energy includes dissipating energy via the deforming.

6. The method of claim 1, wherein the magnetically active body includes a ferromagnetic body and an electrically conductive body, and further wherein the rotating includes sliding the ferromagnetic body against the electrically conductive body.

7. The method of claim 6, wherein the dissipating energy includes dissipating energy via a frictional force that is generated between the ferromagnetic body and the electrically conductive body during the sliding.

8. The method of claim 7, wherein the method further includes resisting motion of the attached component relative to the base structure with the frictional force.

9. The method of claim 1, wherein the magnetically active body includes a ferromagnetic body, and further wherein the dissipating energy includes dissipating energy via a magnetic force between the magnetic assembly and the ferromagnetic body.

10. A method of damping motion between a base structure and an attached component with a motion-damping system that extends within a gap that is defined between the base structure and the attached component, wherein the motion-damping system includes a magnetic assembly and a magnetically active body, wherein the magnetically active body includes a ferromagnetic body and an electrically conductive body, the method comprising:
rotating the attached component relative to the base structure to rotate the magnetic assembly and the magnetically active body relative to one another, wherein the rotating includes sliding the ferromagnetic body against the electrically conductive body; and
dissipating energy with the motion-damping system.

11. The method of claim 10, wherein the dissipating energy includes generating an eddy current within an electrically conductive body that forms a portion of the magnetically active body via a magnetic interaction between the magnetic assembly and the electrically conductive body.

12. The method of claim 11, wherein the method further includes resisting motion of the attached component relative to the base structure with the eddy current.

13. The method of claim 10, wherein the motion-damping system includes a tubular structure, wherein one of the magnetic assembly and the magnetically active body is located within the tubular structure, wherein the other of the magnetic assembly and the magnetically active body is operatively attached to a selected one of the base structure and the attached component, and further wherein the rotating includes permitting the tubular structure to rotate relative to the selected one of the base structure and the attached component.

14. The method of claim 13, wherein the rotating includes deforming a polymeric viscoelastic material that is located within an internal volume of the tubular structure.

15. The method of claim 14, wherein the deforming includes resisting motion of the attached component relative to the base structure with the polymeric viscoelastic material.

16. The method of claim 14, wherein the dissipating energy includes dissipating energy via the deforming.

17. The method of claim 10, wherein the dissipating energy includes dissipating energy via a frictional force that is generated between the ferromagnetic body and the electrically conductive body during the sliding.

18. The method of claim 17, wherein the method further includes resisting motion of the attached component relative to the base structure with the frictional force.

19. The method of claim 10, wherein the dissipating energy includes dissipating energy via a magnetic force between the magnetic assembly and the ferromagnetic body.

\* \* \* \* \*